(12) United States Patent
Grosskopf

(10) Patent No.: US 6,414,321 B1
(45) Date of Patent: Jul. 2, 2002

(54) ARRANGEMENT FOR THREE-DIMENSIONAL IMAGE RECORDING OF PARTICLES USING FLOW-THROUGH SYSTEMS

(76) Inventor: Rudolf Grosskopf, Eschenweg 11, D-89551 Konigsbronn (DE)

( * ) Notice: Subject to any disclaimer, the term of this patent is extended or adjusted under 35 U.S.C. 154(b) by 95 days.

(21) Appl. No.: 09/641,994

(22) Filed: Aug. 18, 2000

(30) Foreign Application Priority Data

Sep. 10, 1999 (DE) .......................................... 199 45 031

(51) Int. Cl.[7] .............................................. G01N 21/05
(52) U.S. Cl. .................... 250/432 R; 250/435; 250/438; 250/461.2; 356/336; 356/246; 356/440
(58) Field of Search ........................... 250/432 R, 435, 250/438, 461.2; 356/246, 336, 440

(56) References Cited

U.S. PATENT DOCUMENTS

| 4,338,024 A | | 7/1982 | Bolz et al. ..................... 356/23 |
| 4,612,614 A | | 9/1986 | Deindoerfer et al. ....... 364/415 |
| 5,003,165 A | | 3/1991 | Sarfati et al. ............. 250/201.2 |
| 5,438,408 A | * | 8/1995 | Weichert et al. ............ 356/336 |
| 5,690,895 A | * | 11/1997 | Matsumoto et al. .......... 422/73 |

* cited by examiner

Primary Examiner—Bruce Anderson
Assistant Examiner—Nikita Wells
(74) Attorney, Agent, or Firm—Fish & Richardson P.C.

(57) ABSTRACT

A confocal imaging system that includes an image-recording system and having a flow-through cuvette that is located in an inclined position with reference to a focal plane of the image-recording system such that the motion of the suspension flow automatically brings the particles to be examined into different focal positions.

3 Claims, 1 Drawing Sheet

ARRANGEMENT FOR THREE-DIMENSIONAL IMAGE RECORDING OF PARTICLES USING FLOW-THROUGH SYSTEMS

BACKGROUND OF THE INVENTION

The original patent describes how images may be recorded confocally using available color-capable matrix receivers. This arrangement makes it possible to scan rapidly many particles simultaneously in three dimensions and multiple spectral ranges, for example tissue cells, on the basis of fluorescing and/or dyed sites in medical applications. In the original patent, provision is made for the required motion in the z axis (focusing-through) of the cells where the latter are located on a slide, and the slide is moved along the optical axis (z direction) by mechanical means. As a result, one plane after the other of the sample (typically cells with the cell nucleus, cell plasma, etc.) is imaged as it is focused on the radiation receiver.

SUMMARY OF THE INVENTION

Many diagnostic methods in medicine employ flow-through systems. Cells are fed to these instruments in a suspension. They are pumped through a flow-through cuvette (often called a cannula or capillary tube) which is located in an optical path. Using suitable illumination, the fluorescence, absorption, and scatter properties for example of the sample are automatically recorded. A great number of cells from one patient may be quickly examined with well-known instruments, and a statistical analysis of the optical properties of the cells may be created automatically. However, these flow-through systems have the disadvantage that the cells cannot be imaged.

The object of the present invention (application for patent of addition) is therefore to show how flow-through systems may be equipped with a capability to record high-resolution, confocal images. For this purpose, the invention provides that the flow-through cuvette (300)(or capillary tube or cannula) is located on the optical path of the imaging system at an angle inclined to its focal plane (13$f$). This arrangement achieves the goal that the cells are automatically brought into different focal planes of the optical system as a result of the flow of the fluid.

BRIEF DESCRIPTION OF THE DRAWINGS

The illustrations show examples for arrangements for practical implementation of the invention.

DESCRIPTION OF THE PREFERRED EMBODIMENTS

Figures 1A, 1B:
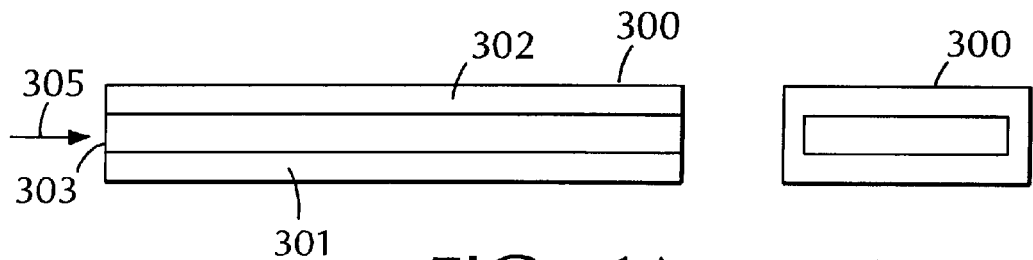
FIG. 1 is a schematic diagram of the flow-through cuvette.

FIG. 1$a$ is a side view in cross section of the flow-through cuvette, and FIG. 1$b$ is the top view. The cuvette has two transparent side walls (301, 302) with favorable optical properties through which the particles in suspension flowing between the walls may be observed. The suspension is fed through inlet opening (303) and flows from the cuvette walls as a stabilized laminar flow to outlet opening (304). The layer thickness of the flow of fluid is determined by the interior distance between the walls of the cuvette and by the laws of wall-stabilized laminar flows. The required tubes and connectors for conducting the suspension to and away from the cuvette are not shown.

Figure 2:
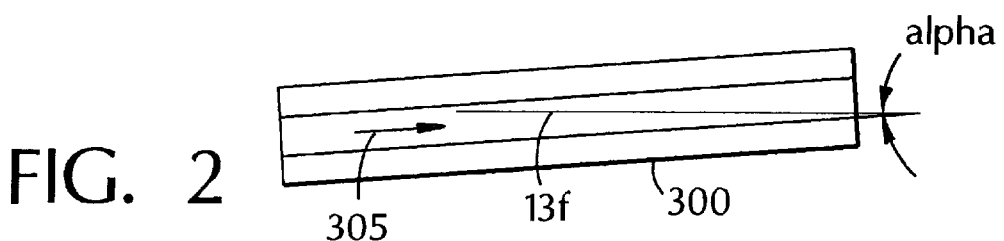
FIG. 2 shows the cuvette inclined to the focal plane according to the invention.
Figure 3:
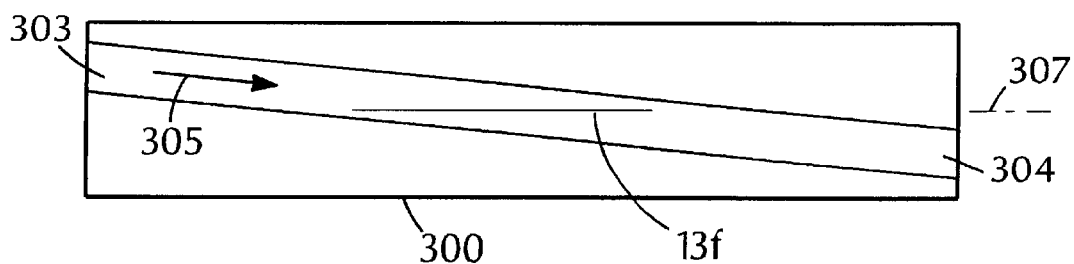
FIG. 3 shows a cuvette fabricated in the form of a cuboid from an optically transparent material, into which cuboid a flow channel is incorporated at an angle inclined to the axis of the cuboid.

FIG. 2 shows cuvette (300) according to the invention in a position inclined to focal plane (13$f$). Focal plane (13$f$) of the image-recording system forms an angle alpha with the interior surface of side wall (301) of cuvette (300). Typically, the inclination of the cuvette surface to the optical path of the imaging system is selected such that all cells flowing in suspension may be completely recorded over the length of the visual field of the recording optics. As a result, the angle of inclination alpha, the thickness layer of the suspension flow, and the size of the available visual field must be adjusted relative to one another. A useful means of illumination is to employ light flashes which are synchronous and time-displaced relative to the readout of frames from the CCD receiver. For example, if the flowrate of the suspension is selected such that 6 light flashes occur during the period of movement of the cell from the time it enters the visual field of the optics to the time it exits the visual field, six different z planes of the flowing volume may be recorded confocally. FIG. 3 shows another embodiment of the cuvette. It is fabricated as a cuboid from an optically transparent material into which a flow channel inclined to the lengthwise axis (307) of the cuboid has been incorporated. As is readily evident, the essential factor in implementing the idea of the invention is the placement of the direction of flow (305) of the suspension at an incline to focal plane (13$f$) of the imaging system.

Any other means which achieves this effect may be employed for arrangements according to the invention. Similarly, multiple inclination-producing means may be employed simultaneously.

The length of line (13$f$) shown in FIG. 3 shows the relative scale for the size of the required visual field of the optical system. It extends almost to the interior walls of the flow channel. This is an advantageous design since very little if any flow movement occurs in the immediate vicinity of the wall.

Depending on the required imaging quality, large magnifications using microscope objectives in particular may require that the optical thickness within the optical path be kept constant over the entire visual field and that optically effective inclined surfaces be avoided. This requirement is met by the embodiment of the cuboid cuvette as shown in FIG. 3. It is useful here to select a material for the cuvette for which the refractive power is the same or nearly the same as the refrangibility of the suspension fluid. This ensures that the light traverses essentially the same optical path over the entire visual field.

Figure 4:
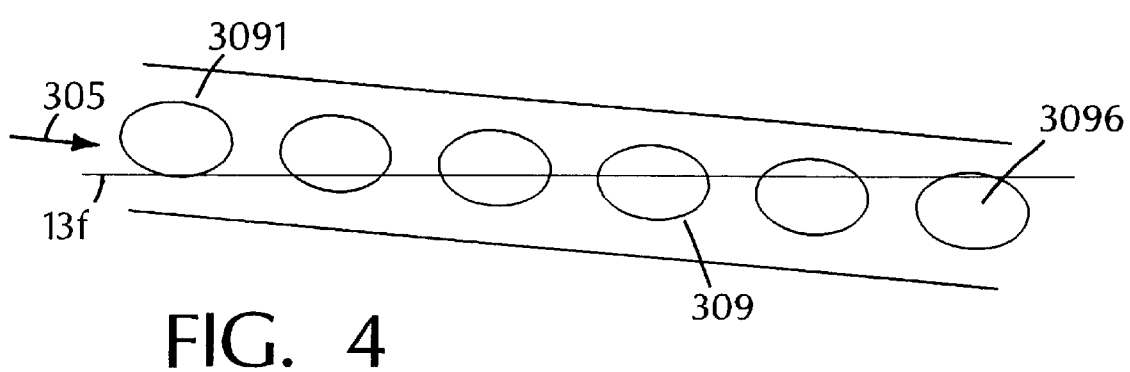
FIG. 4 show an enlarged view of part of the flow channel.

FIG. 4 shows an enlarged view of a section of the flow channel. Cell 309 is shown in six different positions which it assumes sequentially. In the position identified as 3091, its lower portion touches the focal plane. The assumption is made that at the moment it assumes this position, the illumination flash occurs followed by the image readout from the matrix receiver. Conditions then remain dark until the cell assumes the next position not shown in the illustration. Again a light flash occurs and the image is transferred to the computer. Additional images are recorded in the subsequent positions of the cell in the same manner.

The illustration shows as an example the recording of six planes of the cell, one of which touches the bottom of the cell (position 3091), the four subsequent ones capture cross sections of the cell, and the last one (position 3096) touches the top of the cell. It is clearly evident that any desired number of cell planes may be recorded by properly selecting the frequency of flash and imaging as well as the flowrate. Additionally, it is readily apparent without further elucidation to a individual skilled in the art that the successive recordings of the same cell occur at different positions within the visual field of the image-recording system. Using suitable known prior art software, the images from the same cell are integrated in the computer. To facilitate this, the computer program is provided in suitable form with the numerical value of the flowrate.

Additionally, multiple cells with the same image field (frame) may be recorded simultaneously. By taking into account the motion of the flow, the partial images of the cells are properly integrated by the computer.

The applicant believes that the present patent of addition for the first time describes a system which allows images of microscopic cells flowing through a cuvette to be recorded confocally. Additionally, the arrangement described has the advantage that image recording may occur at high speed.

Using currently available matrix receivers, for example, and the arrangement according to the original patent, three million color pixels with four different spectral ranges each may be recorded confocally in one second.

What is claimed is:

1. A confocal imaging system that includes an image-recording system and having a flow-through cuvette that is located in an inclined position with reference to a focal plane of the image-recording system such that the motion of the suspension flow automatically brings the particles to be examined into different focal positions.

2. The confocal imaging system according to claim 1 wherein illumination of tho suspension flow is effected by light flashes.

3. The confocal imaging system according to claim 1 or claim 2, wherein the image-recording system includes a matrix receiver and wherein during a recording phase of the matrix receiver, light flashes occur synchronously and time-displaced relative to readout phases.

* * * * *